US012802199B2

(12) United States Patent
Jeon

(10) Patent No.: US 12,802,199 B2
(45) Date of Patent: Nov. 17, 2026

(54) DEVICE FOR ELECTRONIC COMPONENTS INSPECTION USING IMAGE ANALYSIS

(71) Applicant: BRILS Co., Ltd., Incheon (KR)

(72) Inventor: Jin Jeon, Incheon (KR)

(73) Assignee: BRILS Co., Ltd, Incheon (KR)

( * ) Notice: Subject to any disclaimer, the term of this patent is extended or adjusted under 35 U.S.C. 154(b) by 219 days.

(21) Appl. No.: 18/774,283

(22) Filed: Jul. 16, 2024

(65) Prior Publication Data

US 2025/0104211 A1 Mar. 27, 2025

(30) Foreign Application Priority Data

Sep. 25, 2023 (KR) ........................ 10-2023-0128018

(51) Int. Cl.

| | |
|---|---|
| ***G06T 7/00*** | (2017.01) |
| ***G01J 5/00*** | (2022.01) |
| ***G01N 25/72*** | (2006.01) |
| ***G06T 7/90*** | (2017.01) |
| ***H04N 23/23*** | (2023.01) |

(52) U.S. Cl.

CPC ........... *G06T 7/0004* (2013.01); *G01N 25/72* (2013.01); *G06T 7/90* (2017.01); *G01J 2005/0077* (2013.01); *G06T 2207/10048* (2013.01); *G06T 2207/20016* (2013.01); *G06T 2207/20072* (2013.01); *G06T 2207/20084* (2013.01); *H04N 23/23* (2023.01)

(58) Field of Classification Search

CPC ..................... G06T 7/0004; G06T 7/90; G06T 2207/10048; G06T 2207/20016; G06T 2207/20072; G06T 2207/20084; G06T 2207/20081; G01N 25/72; G01J 2005/0077; H04N 23/23

See application file for complete search history.

(56) References Cited

U.S. PATENT DOCUMENTS

| | | | | |
|---|---|---|---|---|
| 11,893,723 | B2 * | 2/2024 | Ota | G06T 7/0004 |
| 2018/0372649 | A1 * | 12/2018 | Ortiz | G01B 11/24 |
| 2019/0205606 | A1 * | 7/2019 | Zhou | G06F 18/285 |

(Continued)

FOREIGN PATENT DOCUMENTS

| | | | | |
|---|---|---|---|---|
| KR | 20050011919 A | * | 1/2005 | G01M 17/007 |
| KR | 10-2008-0019155 A | | 3/2008 | |

(Continued)

*Primary Examiner* — Oneal R Mistry
*Assistant Examiner* — Jongbong Nah
(74) *Attorney, Agent, or Firm* — Bridgeway IP Law Group, PLLC; Jihun Kim

(57) ABSTRACT

An embodiment proposes an electronic component inspection device using image analysis to ensure safety and quality by inspecting the condition of electronic parts included in a car seat. The electronic component inspection device using the image analysis may include a booth which forms a closed space and in which at least one car seat to be inspected is placed, a conveyor moving the at least one car seat into the booth or moving the inspected car seat to the outside of the booth, an inspection part acquiring data generated from electronic equipment included in the at least one car seat, when the at least one car seat is placed at a preset position inside the booth through the conveyor, and a controller controlling the booth, the conveyor, and the inspection part.

4 Claims, 5 Drawing Sheets

(56) References Cited

U.S. PATENT DOCUMENTS

2021/0020360 A1* 1/2021 He ........................ G06F 18/214
2022/0107243 A1* 4/2022 Park .................... G01M 99/001

FOREIGN PATENT DOCUMENTS

KR 10-2015-0069053 A 6/2015
KR 10-2019-0006823 A 1/2019
KR 10-2022-0132220 A 9/2022
WO WO-2024081172 A1 * 4/2024 ............. G06V 10/82

* cited by examiner

DEVICE FOR ELECTRONIC COMPONENTS INSPECTION USING IMAGE ANALYSIS

CROSS-REFERENCE TO RELATED APPLICATIONS

This application claims the priority of Korean Patent Application No. 10-2023-0128018 filed on Sep. 25, 2023, in the Korean Intellectual Property Office, the disclosure of which is incorporated herein by reference.

TECHNICAL FIELD

The present disclosure relates to the manufacture of vehicle parts. More specifically, the present disclosure relates to an electronic component inspection device using image analysis to ensure safety and quality by inspecting the condition of electronic parts included in a car seat.

BACKGROUND

A car seat is designed to maintain a passenger's riding posture in an optimal condition, and includes a seat cushion that supports the passenger's lower body, a seat back that supports the passenger's upper body, and a head rest that supports the passenger's head.

Generally, the car seat is manufactured by injecting polyurethane foam into a mold to produce a foam molded body and covering its outside with a seat cover. In order to form the car seat through the mold, a parting agent is sprayed onto the inner surface of the mold to prevent the molded product from adhering to the inner surface of the mold.

The parting agent refers to a chemical such as silicone resin that is applied to the mold to prevent the molded product from being attached to the mold, to allow the molded product to be easily detached therefrom, and to enable the surface of the molded product to be finished flat.

Conventionally, in order to apply the parting agent to the inner surface of the mold, a worker directly sprays the parting agent onto the inner surface of the mold through a spray containing the parting agent. Thus, this is problematic in that it may cause a loss of manpower for spraying the parting agent, and it is practically impossible to uniformly spray the parting agent onto the inner surface of the mold due to manual work, making it difficult to ensure the quality of the molded product.

Meanwhile, automotive electronic components refer to equipment related to electrical and electronic parts included in a vehicle. For example, the automotive electronic components refer to all parts or devices, which conduct electricity, such as a motor, a black box, a central control unit, a speed sensor, a switch, a speaker, an audio, and a camera. Among them, the electronic components included in a car seat may include a motor that drives a seat, a heating module that heats a seat cushion and a seat back, and a ventilation module that blows air into the seat cushion and the seat back.

Conventionally, in order to inspect the electronic components included in the car seat, the inspection is performed while a worker directly operates each part one by one. Thus, this is problematic in that it may cause a loss of manpower for inspecting the electronic components, and it is difficult to objectively evaluate safety and quality due to manual work.

PRIOR ART DOCUMENT

Patent Document (Patent Document 1) Korean Patent Publication No. 10-2008-0019155, 'Car seat and manufacturing method thereof', (2008 Mar. 3)

SUMMARY

In view of the above, the present disclosure provides an electronic component inspection device using image analysis to ensure safety and quality by inspecting the condition of electronic parts included in a car seat.

Technical objects to be achieved by the present disclosure are not limited to those described above, and other technical objects that are not mentioned above may also be clearly understood from the descriptions given below by those skilled in the art to which the present disclosure belongs.

The present disclosure provides an electronic component inspection device using image analysis to ensure safety and quality by inspecting the condition of electronic parts included in a car seat. The electronic component inspection device using the image analysis may include a booth which forms a closed space and in which at least one car seat to be inspected is placed, a conveyor moving the at least one car seat into the booth or moving the inspected car seat to the outside of the booth, an inspection part acquiring data generated from electronic equipment included in the at least one car seat, when the at least one car seat is placed at a preset position inside the booth through the conveyor, and a controller controlling the booth, the conveyor, and the inspection part.

The inspection part may further include at least one microphone that detects noise generated from the car seat placed in the booth.

The controller may apply power to at least one motor included in the car seat, detect noise generated in the motor according to the operation of the motor, and compare the detected noise with pre-stored noise data, thereby detecting defects in the car seat.

The controller may apply power to a ventilation module included in the car seat, detect noise generated according to the operation of the ventilation module, and compare the detected noise with pre-stored noise data, thereby detecting defects in the car seat.

The controller may separate the detected noise into frequencies for each sound wave, and identify each of a plurality of motors based on the separated frequencies.

The controller may identify the type of defect based on the waveform of the separated frequency through Artificial Intelligence (AI), which is machine learned in advance based on the type of defect according to the waveform of the frequency.

The inspection part may further include a thermal imaging camera that detects radiant heat emitted from the car seat placed in the booth.

The controller may identify a plurality of heat source points based on a thermal image photographed through the thermal imaging camera, generate an RGB (Red, Green, Blue) histogram for pixels included in an area within a preset distance from each of the plurality of heat source points, and compare the RGB histograms generated from areas corresponding to the plurality of heat source points, thereby detecting defects in the car seat.

The controller may detect defects in the car seat by inputting the thermal image into an AI model implemented with a Convolutional Neural Network (CNN).

The controller may change the resolution of the thermal image to create an image group including a plurality of two-dimensional images with different resolutions, input all the two-dimensional images included in the image group into the AI model implemented with the CNN, and then combine a plurality of result values output from the AI model, thereby detecting defects in the car seat.

The CNN may have a transformer encoder-decoder structure, the controller may line up data forming the thermal image to transform it into a single sequence and input it into an encoder, the encoder may apply self-attention to transform it into a single vector where data positions in the sequence are interconnected and input the transformed vector into a decoder, and the decoder may detect in the car seat using a loss function based on the Hungarian algorithm.

When performing a convolution operation on an input feature map to generate an output feature map, the encoder may perform the convolution operation by reflecting the learnable offset in the size of a convolution filter, which is an area from which features are extracted, thereby extracting features from a grid area that is wider than the size of the convolution filter.

The encoder may use an attention key as an offset when performing the self-attention.

Specific details of other embodiments are included in the detailed description and drawings.

Advantageous Effects

According to an aspect of the present disclosure, it is possible to ensure safety and quality by inspecting the condition of electronic parts included in a car seat.

Effects of the present disclosure are not limited to the above-mentioned effects, and other effects which are not mentioned will be clearly understood by those skilled in the art from the following claims.

DETAILED DESCRIPTION

Figure 1:
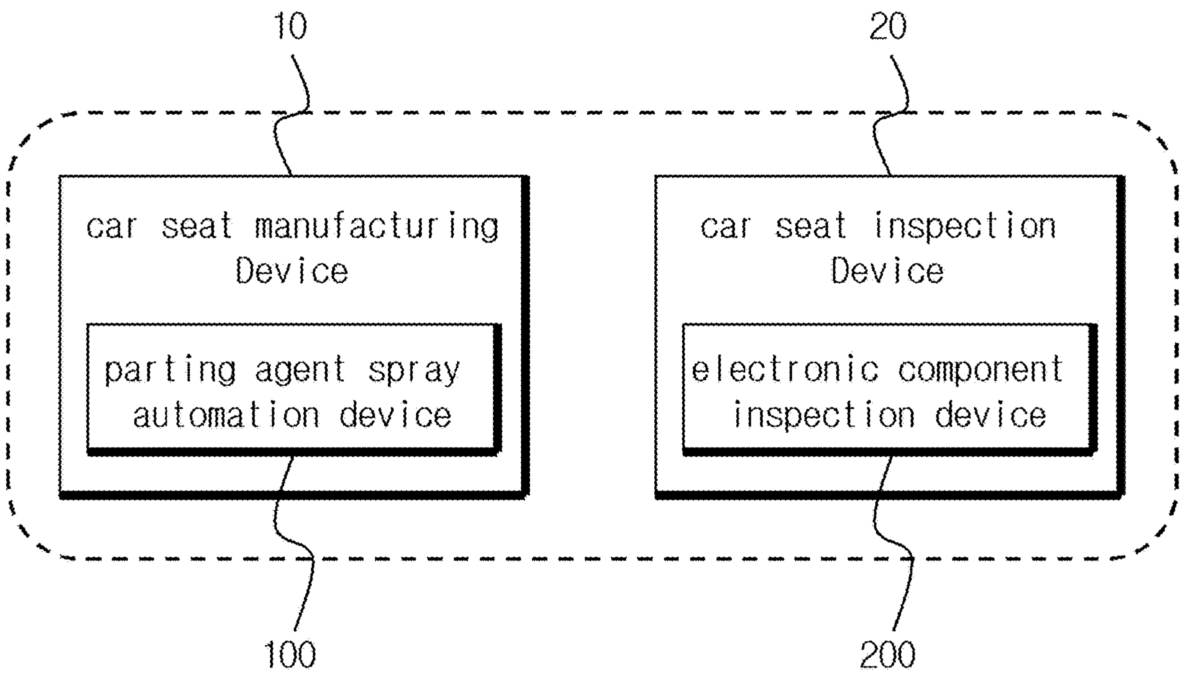
FIG. 1 is a configuration diagram showing a car seat manufacturing system according to an embodiment of the present disclosure.

It should be noted that technical terms used in this specification are only used to describe specific embodiments and are not intended to limit the present disclosure. Unless otherwise defined, the technical terms used herein should be interpreted as meanings generally understood by those skilled in the art in the technical field to which the present disclosure pertains, and should not be interpreted in an overly comprehensive or overly narrow sense. Further, if the technical terms used in this specification are incorrect technical terms that do not accurately express the idea of the present disclosure, they should be replaced with technical terms that can be correctly understood by those skilled in the art. Furthermore, general terms used in the present disclosure should be interpreted according to the definition in the dictionary or the context, and should not be interpreted in an excessively limited sense.

In the present disclosure, the singular forms are intended to include the plural forms as well, unless the context clearly indicates otherwise. It will be further understood that the terms "comprise", "have", etc. when used in this specification, specify the presence of stated steps or components but do not preclude the presence or addition of one or more other steps or components.

It will be understood that, although the terms "first", "second", etc. may be used herein to describe various elements, these elements should not be limited by these terms. These terms are only used to distinguish one element from another element. For instance, a first element could be termed a second element without departing from the scope of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

Hereinafter, preferred embodiments of the present disclosure will be described in detail with reference to the accompanying drawings. Like reference numerals refer to like parts throughout various figures and embodiments of the present disclosure, and a duplicated description thereof will be omitted. When it is determined that the detailed description of the known art related to the present disclosure may obscure the gist of the present disclosure, the detailed description will be omitted. Further, it is to be noted that the accompanying drawings are only intended to easily understand the spirit of the present disclosure and are not to be construed as limiting the spirit of the present disclosure. It is to be understood that the present disclosure is intended to cover not only the exemplary embodiments, but also various alternatives, modifications, equivalents and other embodiments that fall within the spirit and scope of the present disclosure.

Meanwhile, a parting agent refers to a chemical such as silicone resin that is applied to a mold to prevent a molded product from being attached to the mold, to allow the molded product to be easily detached therefrom, and to enable the surface of the molded product to be finished flat. Conventionally, in order to apply the parting agent to the inner surface of the mold, a worker directly sprays the parting agent onto the inner surface of the mold through a spray containing the parting agent. Thus, this is problematic in that it may cause a loss of manpower for spraying the parting agent, and it is practically impossible to uniformly spray the parting agent onto the inner surface of the mold due to manual work, making it difficult to ensure the quality of the molded product.

Meanwhile, automotive electronic components refer to equipment related to electrical and electronic parts included in a vehicle. For example, the automotive electronic components refer to all parts or devices, which conduct electricity, such as a motor, a black box, a central control unit, a speed sensor, a switch, a speaker, an audio, and a camera. Among them, the electronic components included in a car seat may include a motor that drives a seat, a heating module that heats a seat cushion and a seat back, and a ventilation module that blows air into the seat cushion and the seat back. Conventionally, in order to inspect the electronic components included in the car seat, the inspection is performed while a worker directly operates each part one by one. Thus, this is problematic in that it may cause a loss of manpower for inspecting the electronic components, and it is difficult to objectively evaluate safety and quality due to manual work.

In order to overcome these problems, the present disclosure is intended to propose various means that can automate the spraying of the parting agent to prevent the molded product from adhering to the inner surface of the mold when the head rest of the car seat is formed through the mold, and can ensure safety and quality by inspecting the condition of the electronic parts of the car seat.

FIG. 1 is a configuration diagram showing a car seat manufacturing system according to an embodiment of the present disclosure.

Referring to FIG. 1, a car seat manufacturing system 30 according to an embodiment of the present disclosure may include a car seat manufacturing device 10 and a car seat inspection device 20.

Since components of the car seat manufacturing system according to an embodiment of the present disclosure merely represent functionally distinct elements, two or more components may be integrated with each other in an actual physical environment, or one component may be separated from another component in an actual physical environment.

When describing each component, the car seat manufacturing device 10 may manufacture a vehicle seat that may be included in vehicle parts.

Here, the car seat is designed to maintain the optimal riding posture of a passenger in the vehicle, and may include a seat cushion that supports the passenger's lower body, a seat back that supports the passenger's upper body, and a head rest that supports the passenger's head. Further, the car seat may include a frame forming a basic structure, a fabric cover, a heater module, a ventilation module, and a plastic cover surrounding the exterior.

First, in order to manufacture the car seat, the car seat manufacturing device 10 may manufacture a foam pad, which is the basis for manufacturing the seat cushion, the seat back, and the head rest, through injection molding.

For example, the foam pad may use polyol and isocyanate as main materials, and may be manufactured by mixing various chemicals and foaming the chemicals in a casting mold at a certain temperature.

Meanwhile, in a foam pad molding process, a parting agent may be applied to the inner surface of the mold so that a raw material does not adhere to the surface of the foam pad mold but may be easily removed.

Particularly, the car seat manufacturing device 10 according to an embodiment of the present disclosure may include a parting agent spray automation device 100 for automating the spraying of the parting agent to prevent the molded product from being attached to the surface of the mold when molding the head rest of the car seat through the mold.

The parting agent spray automation device 100 may include at least one mold corresponding to the shape of a part included in the car seat, a turn table in which at least one mold is installed and which rotates at least one installed mold about a specific point, a spray part that sprays the parting agent onto the at least one mold as the turn table rotates, and a controller that controls the at least one mold, the turn table, and the spray part.

Meanwhile, a specific structure of the parting agent spray automation device 100 according to an embodiment of the present disclosure will be described below in detail with reference to FIG. 2.

Further, the car seat manufacturing device 10 may insert various subsidiary materials into the mold to which the parting agent is applied, then inject the raw material therein, and separate the molded product from the mold when a certain period of time has elapsed. Thereafter, the car seat manufacturing device 10 may transfer the foam pad separated from the mold through a crushing process for removing air pockets to a next process.

The car seat manufacturing device 10 may put a cover on the outer surface of the foam pad corresponding to each of the seat cushion, the seat back, and the head rest, and assemble it with a back frame. The car seat manufacturing device 10 may further assemble injection parts such as additional covers and levers with the assembled assembly.

Finally, the car seat manufacturing device 10 may manufacture the car seat by removing wrinkles from a seat cover by spraying steam onto the assembly, ironing the assembly, and passing the assembly through an infrared heating booth.

In the following configuration, the car seat inspection device 20 may inspect the function, performance, stability, etc. on the car seat manufactured by the car seat manufacturing device 10.

For example, the car seat inspection device 20 may inspect electronic parts included in the car seat. For example, the electronic parts included in the car seat may include a motor that drives a seat, a heating module that heats a seat cushion and a seat back, and a ventilation module that blows air into the seat cushion and the seat back.

Particularly, the car seat inspection device 20 according to an embodiment of the present disclosure may include an electronic component inspection device 200 for inspecting the electronic parts included in the car seat.

Specifically, the electronic component inspection device 200 may include a booth which forms a closed space and in which at least one car seat to be inspected is placed, a conveyor which moves at least one car seat into the booth or moves the inspected car seat to the outside of the booth, an inspection part which acquires data generated from the electronic parts included in at least one car seat, when at least one car seat is placed at a preset position inside the booth through the conveyor, and a controller which controls the booth, the conveyor, and the inspection part.

Meanwhile, a specific configuration of the electronic component inspection device 200 according to an embodiment of the present disclosure will be described below in detail with reference to FIG. 3.

As such, the car seat manufacturing system 30 according to an embodiment of the present disclosure automates the spraying of the parting agent to prevent the molded product from being attached to the inner surface of the mold when molding the part of the car seat through the mold, thereby minimizing the loss of manpower for spraying the parting agent and securing the quality of the molded product.

Further, the car seat manufacturing system 30 according to an embodiment of the present disclosure may ensure safety and quality by inspecting the condition of the electronic parts included in the car seat.

Hereinafter, the configuration of the parting agent spray automation device 100 according to an embodiment of the present disclosure will be described in detail.

Figure 2:
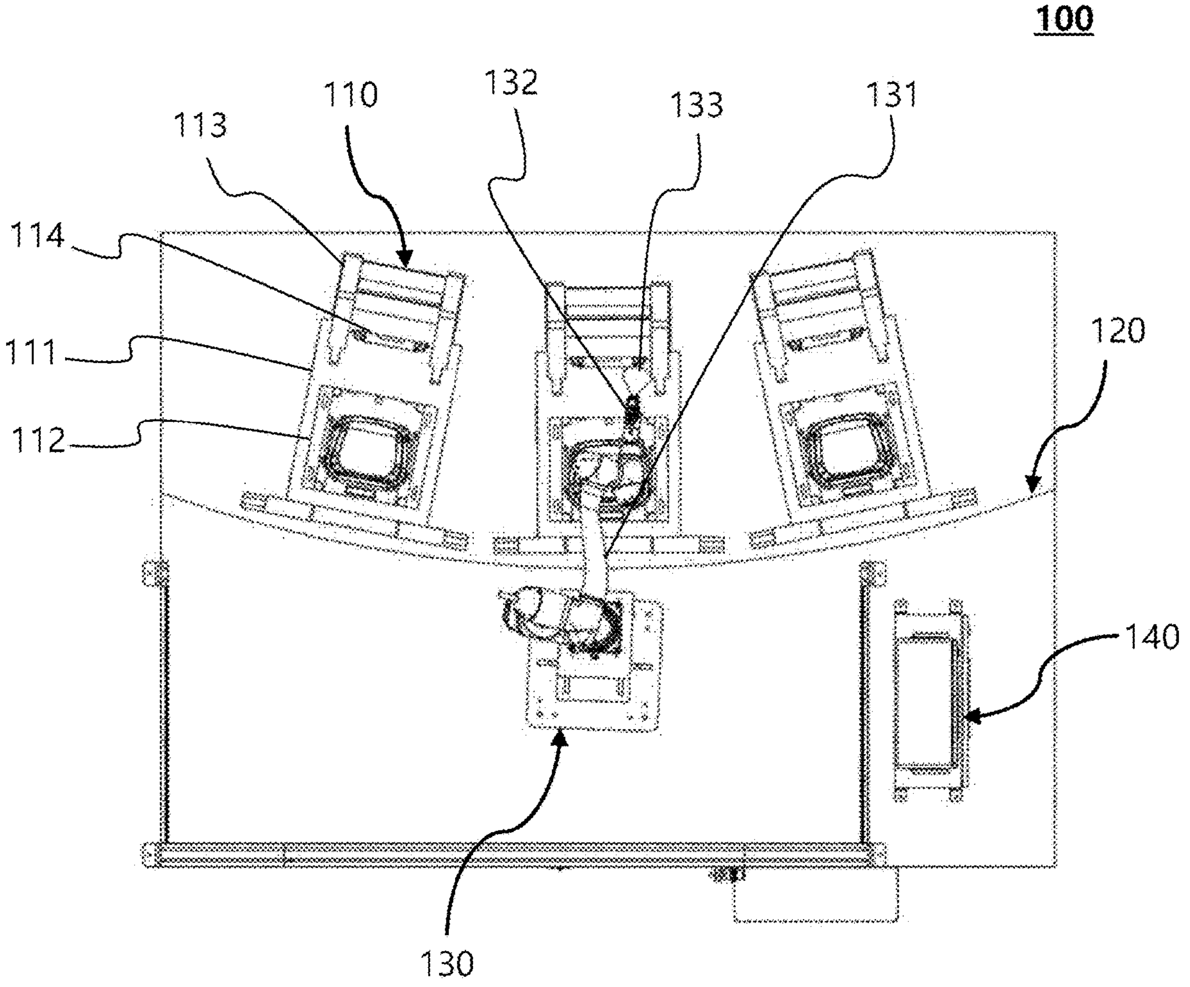
FIG. 2 is a top view showing the configuration of a parting agent spray automation device according to an embodiment of the present disclosure.

FIG. 2 is a top view showing the configuration of a parting agent spray automation device according to an embodiment of the present disclosure.

Referring to FIG. 2, the parting agent spray automation device 100 according to an embodiment of the present disclosure may include a mold structure 110, a turn table 120, a spray part 130, and a controller 140.

When each component is described, the mold structure 110 may be configured to include a mold having an inner surface corresponding to the shape of a part included in the car seat.

Specifically, the mold structure 110 may be divided into a movable mold part 111 and a fixed mold part 113, and may be configured so that the movable mold part 111 is movably coupled to the fixed mold part 113 or the movable mold part 111 is separated from the fixed mold part 113.

The movable mold part 111 may be disposed to face the fixed mold part 113, define a mold space in which a movable mold 112 for molding the molded product is disposed, and be configured to include the movable mold 112 that is disposed in the mold space to define a cavity having a shape corresponding to that of the molded product. In addition, the movable mold part 111 may include an extrusion hole formed in the cavity to extrude the molded product formed in the cavity, and an extrusion pin operably inserted into the extrusion hole.

The fixed mold part 113 may define a mold space in which a fixed mold 114 for molding the molded product is disposed, and be configured to include the fixed mold 114 that is disposed in the mold space to define a cavity having a shape corresponding to that of the molded product. In addition, the fixed mold part 113 may include an extrusion hole formed in the cavity to extrude the molded product formed in the cavity, and an extrusion pin operably inserted into the extrusion hole.

The mold structure 110 may include an RFID tag for position recognition. Specifically, the mold structure 110 may include RFID tags capable of recognizing the position, which are installed in the movable mold 112 of the movable mold part 111 and the fixed mold 114 of the fixed mold part 113, respectively.

In the following configuration, the turn table 120 may be equipped with at least one mold structure 110, and rotate at least one installed mold structure 110 about a specific point.

Specifically, the turn table 120 may circulate the mold structure 110 to each fixing device so as to manufacture the foam pad, which is the basis for the seat cushion, the seat back, and the head rest through injection molding during the process of manufacturing the car seat.

For example, the turn table 120 may move the mold structure 110 to the parting agent spray automation device 100 for applying the parting agent to the mold structure 110 through rotation, rotate to move the mold structure 110 to the device for inserting the mold material into the mold structure 110 when the parting agent spray automation device 100 has sprayed the parting agent onto the mold structure 110, and move the mold structure 110 to a device for heating the mold structure 110 when a mold material is inserted into the mold structure 110, thereby supporting the manufacture of the molded product.

In the following configuration, the spray part 130 may spray the parting agent onto the inner surface of at least one mold as the turn table 120 rotates. Here, the mold may include the above-described movable mold 112 and fixed mold 114.

Specifically, the spray part 130 may include a manipulator 131, a limit switch 132, and a spray nozzle 133.

The manipulator 131 may include at least one joint to be operated by the rotation of the turn table 120. That is, the manipulator 131 may be an articulated manipulator capable of moving the spray nozzle 133 to each area of the inner surface of the mold. However, without being limited thereto, the manipulator 131 may be a cartesian manipulator, a cylindrical manipulator, a spherical manipulator, a SCARA (Selective Compliant Assembly Robot Arm) manipulator, etc. depending on the joint structure.

The limit switch 132 may be installed on a side of the manipulator 131 to detect the position of at least one mold. For example, the limit switch 132 may be a micro switch, a roller lever switch, a plunger switch, a rotary switch, etc.

Next, the spray nozzle 133 may be installed on an end of the manipulator 131 to spray the parting agent according to the position of the mold structure detected by the limit switch 132.

Here, the parting agent may be used to prevent the molded product from bonding to the mold surface. If the parting agent is not used, there may occur a problem where a molding material fuses to the mold. Such a parting agent may form a barrier between the molded product and the mold surface, eliminating an adhesive force between the molded product and the mold, preventing damage to the mold, and allowing the molded product to be quickly and easily separated from the mold.

Further, the spray part 130 may include a vision sensor that is installed on the manipulator 131 to photograph at least one mold structure 110. The spray part 130 may include an RFID reader that may recognize the RFID tag provided on the mold structure 110. The spray part 130 may include a distance measurement sensor that measures a distance from the vision sensor to the mold.

In the following configuration, the controller 140 may control at least one mold structure 110, the turn table 120, and the spray part 130.

Specifically, when the mold is located at a preset position within the working range of the spray part 130 by the turn table 120, the controller 140 may detect the edge of the mold through the limit switch 132, and control to spray the parting agent while the spray nozzle 133 moves in a zigzag fashion along the inner surface of the mold based on the edge detected through the manipulator 131.

At this time, the controller 140 may control to primarily spray the parting agent while the spray nozzle 133 moves in the zigzag fashion along the inner surface of the mold based on the edge detected on the inner surface of the mold, and may control to secondarily spray the parting agent while the spray nozzle 133 moves along the detected edge.

Meanwhile, if the structure is relatively complex depending on the shape of the inner surface of the mold, a large amount of parting agent is required because an adhesive area between the molded product and the mold is large. In the case of a relatively simple structure, a small amount of parting agent is required because an adhesive area between the molded product and the mold is small.

Thus, the controller 140 may recognize the shape of the inner surface of at least one mold through the vision sensor, and adjust the spray amount of the parting agent for each part according to the recognized shape.

At this time, the controller 140 may cumulatively store the spray amount of the parting agent according to the recognized shape, and determine the spray amount of the parting agent for each part of the identified mold structure through AI (Artificial Intelligence), which is machine learned in advance, based on the cumulatively stored spray amount of the parting agent.

That is, the controller 140 may cumulatively store a design drawing that stores information on the spray amount of the parting agent for each part according to the type of the mold, and determine the spray amount of the parting agent for each part of the newly recognized mold through AI that has been machine-learned in advance based on the cumulatively stored design drawing.

Further, the controller 140 may recognize the RFID tag through the RFID reader to identify the position and type of the mold, set the moving path of the spray nozzle 133 based on the identified position and type of the mold, compare the identified type of the mold with the shape of the mold recognized through the vision sensor to recognize the distortion of the mold, and correct the set moving path according to the recognized degree of distortion.

Further, the controller 140 may photograph the molded product injected from the mold through the vision sensor, analyze the surface of the molded product based on the photographed image, and correct a preset moving path for the mold and the spray amount of the parting agent according to the analysis result.

For example, the controller 140 may correct the moving path and the spray amount of the parting agent by analyzing the surface of the finished molded product to identify a point where the additional spraying of the parting agent is required or a point where the spray amount of the parting agent should be increased.

Further, the controller 140 may fuse the image of the mold photographed from the vision sensor and distance information obtained from the distance measurement sensor to generate a fusion image containing the distance information per pixel, and may generate the moving path of the spray nozzle based on the generated fusion image.

At this time, the controller 140 may generate the moving path of the spray nozzle, generate an x-axis moving path corresponding to the width of the inner surface of the mold based on the fusion image, and apply a y-axis coordinate corresponding to the depth of the inner surface of the mold to each coordinate of the x-axis moving path, thereby generating a final moving path.

That is, the controller 140 may accurately control the distribution of the parting agent by generating the moving path in consideration of the depth of the inner surface of the mold through the distance measurement sensor, thereby improving the quality of the molded product.

Hereinafter, the configuration of the electronic component inspection device 200 according to an embodiment of the present disclosure will be described in detail.

Figure 3:
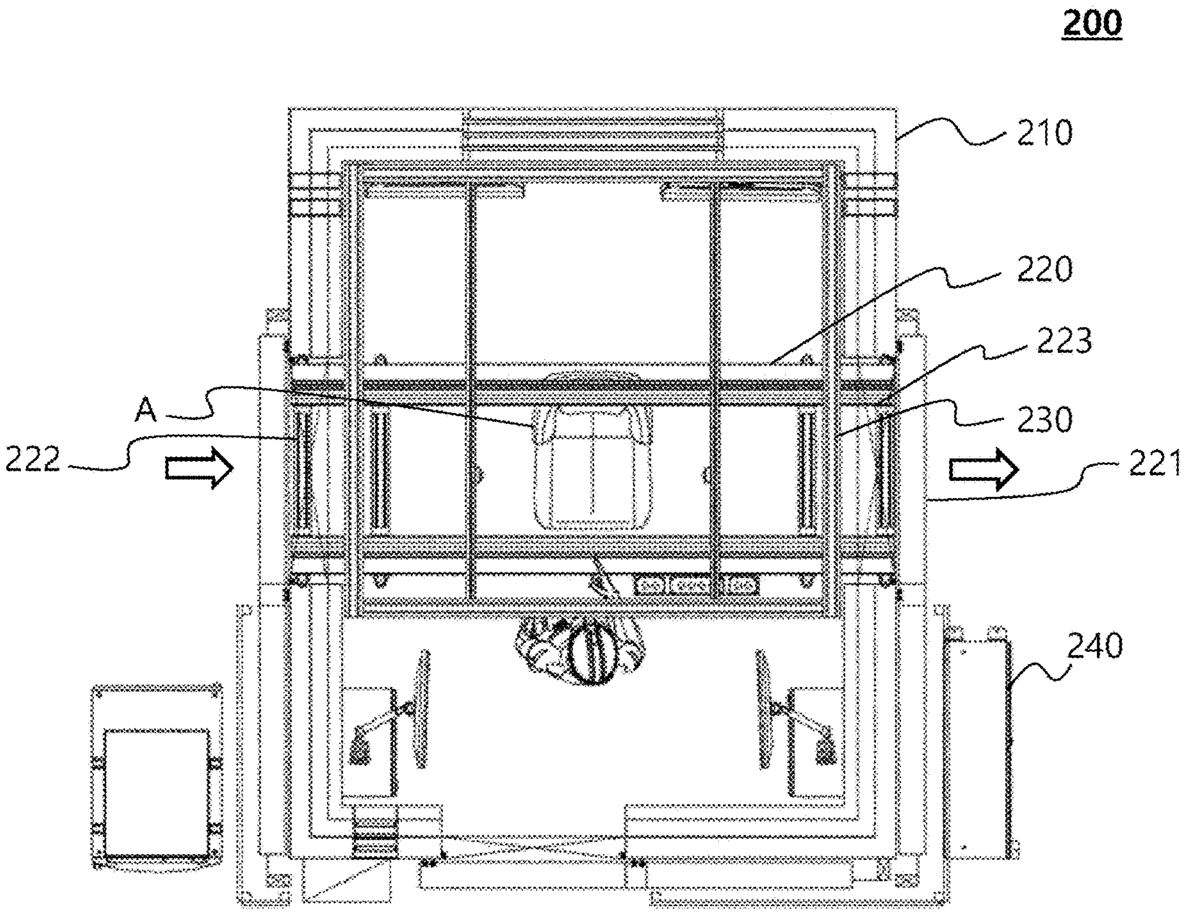
FIG. 3 is a top view showing the configuration of a device for inspecting electronic components according to an embodiment of the present disclosure.

FIG. 3 is a top view showing the configuration of the device for inspecting electronic components according to an embodiment of the present disclosure.

Referring to FIG. 3, the electronic component inspection device 200 through the image analysis according to an embodiment of the present disclosure may include a booth 210, a conveyor 220, an inspection part 230, and a controller 240.

When each component is described, the booth 210 may define a closed space, and at least one car seat A to be inspected may be disposed therein.

Specifically, the booth 210 may form a soundproof space through which the conveyor 220 operating along a transfer path may pass, and opening/closing doors 221 may be installed on both sides along the transfer direction of the car seat A. Here, the opening/closing door 221 may open or close a car seat inlet 222 formed on one side of the booth 210, and open or close a car seat outlet 223 formed on the other side of the booth 210.

The conveyor 220 may move at least one car seat A into the booth 210 or move the car seat A on which inspection has been completed out of the booth 210. Here, various conveyors, which may move products, such as a belt conveyor, a screw conveyor, a bucket conveyor, a roller conveyor, and a trolley conveyor, may be applied.

When at least one car seat A is placed at a preset position in the booth 210 through the conveyor 220, the inspection part 230 may acquire data generated from electronic equipment included in at least one car seat A.

Specifically, the inspection part 230 may be comprises of at least one microphone that detects noise generated from the car seat placed in the booth. Further, the inspection part 230 may include a thermal imaging camera that detects radiant heat emitted from the car seat placed in the booth. Further, the inspection part 230 may measure current generated from the electronic part included in the car seat A.

In the following configuration, the controller 240 may control the booth 210, the conveyor 220, and the inspection part 230. Specifically, the controller 240 may apply power to at least one motor included in the car seat A, detect noise generated by the motor according to the operation of the motor, and compare the detected noise with pre-stored noise data, thereby detecting defects in the car seat.

At this time, the controller 240 may perform triangulation using the intensity of three or more noises received by a plurality of microphones, estimate a relative positional relationship between the plurality of microphones and a noise generating area based on the performed triangulation, and detect a defective position by reflecting the estimated relative positional relationship.

Here, the controller 240 may separate the detected noise into frequencies for each sound wave, and identify each of a plurality of motors based on the separated frequencies. At this time, the controller 240 may identify the type of defect based on the waveform of the separated frequency through Artificial Intelligence (AI), which is machine learned in advance based on the type of defect according to the waveform of the frequency.

Further, the controller 240 may apply power to a ventilation module included in the car seat A, detect noise generated according to the operation of the ventilation module, and compare the detected noise with pre-stored noise data, thereby detecting defects in the car seat.

Further, the controller 240 may identify a plurality of heat source points based on a thermal image photographed through the thermal imaging camera, generate an RGB (Red, Green, Blue) histogram for pixels included in an area within a preset distance from each of the plurality of heat source points, and compare the RGB histograms generated from areas corresponding to the plurality of heat source points, thereby detecting defects in the car seat. Here, the RGB histogram is a graph showing the brightness distribution of each primary color (RGB) in the image. For example, in the RGB histogram, a horizontal axis shows the brightness level of the color, while a vertical axis shows the number of pixels assigned to the brightness level of the color. The more pixels are biased to the left, the darker and less vivid the color may be expressed. The more pixels are biased to the right, the brighter and more vibrant the color may be expressed. In this way, the controller 240 may detect defects by comparing the color saturation, grayscale, white balance tendency, etc. of the plurality of heat source point areas through the RGB histogram.

Further, the controller 240 may detect defects in the car seat A by inputting the thermal image into an AI model implemented with a Convolutional Neural Network (CNN).

That is, the controller 240 may change the resolution of the thermal image to create an image group including a plurality of two-dimensional images with different resolutions, input all the two-dimensional images included in the image group into the AI model implemented with the CNN, and then combine a plurality of result values output from the AI model, thereby detecting defects in the car seat A.

Here, the CNN may have a transformer encoder-decoder structure.

The controller 240 may line up data forming the thermal image to transform it into a single sequence and input it into an encoder. The encoder may apply self-attention to transform it into a single vector where data positions in the sequence are interconnected and input the transformed vector into a decoder. The decoder may detect in the car seat A using a loss function based on the Hungarian algorithm.

At this time, when performing a convolution operation on an input feature map to generate an output feature map, the encoder may perform the convolution operation by reflecting the learnable offset in the size of a convolution filter, which is an area from which features are extracted, thereby extracting features from a grid area that is wider than the size of the convolution filter. Further, the encoder may use an attention key as an offset when performing the self-attention.

Hereinafter, the parting agent spray process of the parting agent spray automation device will be described with reference to FIG. 4.

Figure 4:
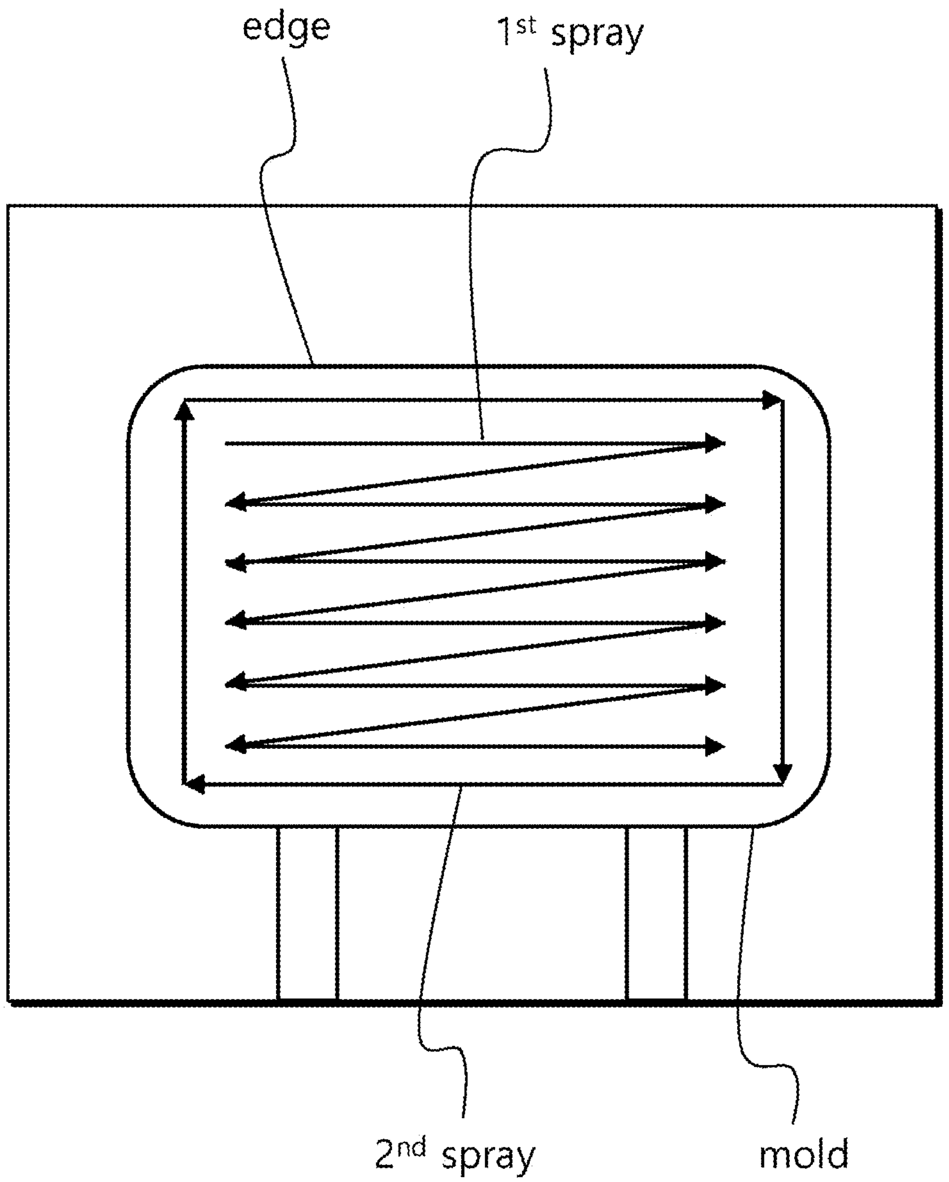
FIG. 4 is an example diagram illustrating a parting agent spray process of a parting agent spray automation device according to an embodiment of the present disclosure.

FIG. 4 is an example diagram illustrating the parting agent spray process of the parting agent spray automation device according to an embodiment of the present disclosure.

Referring to FIG. 4, when the mold is located at a preset position within the working range of the spray part by the turn table, the controller 140 may detect the edge of the mold through the limit switch, and control to spray the parting agent while the spray nozzle moves in a zigzag fashion along the inner surface of the mold based on the edge detected through the manipulator.

At this time, the controller 140 may control to primarily spray the parting agent while the spray nozzle moves in the zigzag fashion along the inner surface of the mold based on the edge detected on the inner surface of the mold, and may control to secondarily spray the parting agent while the spray nozzle moves along the detected edge.

Meanwhile, if the structure is relatively complex depending on the shape of the inner surface of the mold, a large amount of parting agent is required because an adhesive area between the molded product and the mold is large. In the case of a relatively simple structure, a small amount of parting agent is required because an adhesive area between the molded product and the mold is small.

Thus, the controller 140 may recognize the shape of the inner surface of at least one mold through the vision sensor, and adjust the spray amount of the parting agent for each part according to the recognized shape.

Hereinafter, the process of detecting defects using the AI model will be described with reference to FIG. 5.

Figure 5:
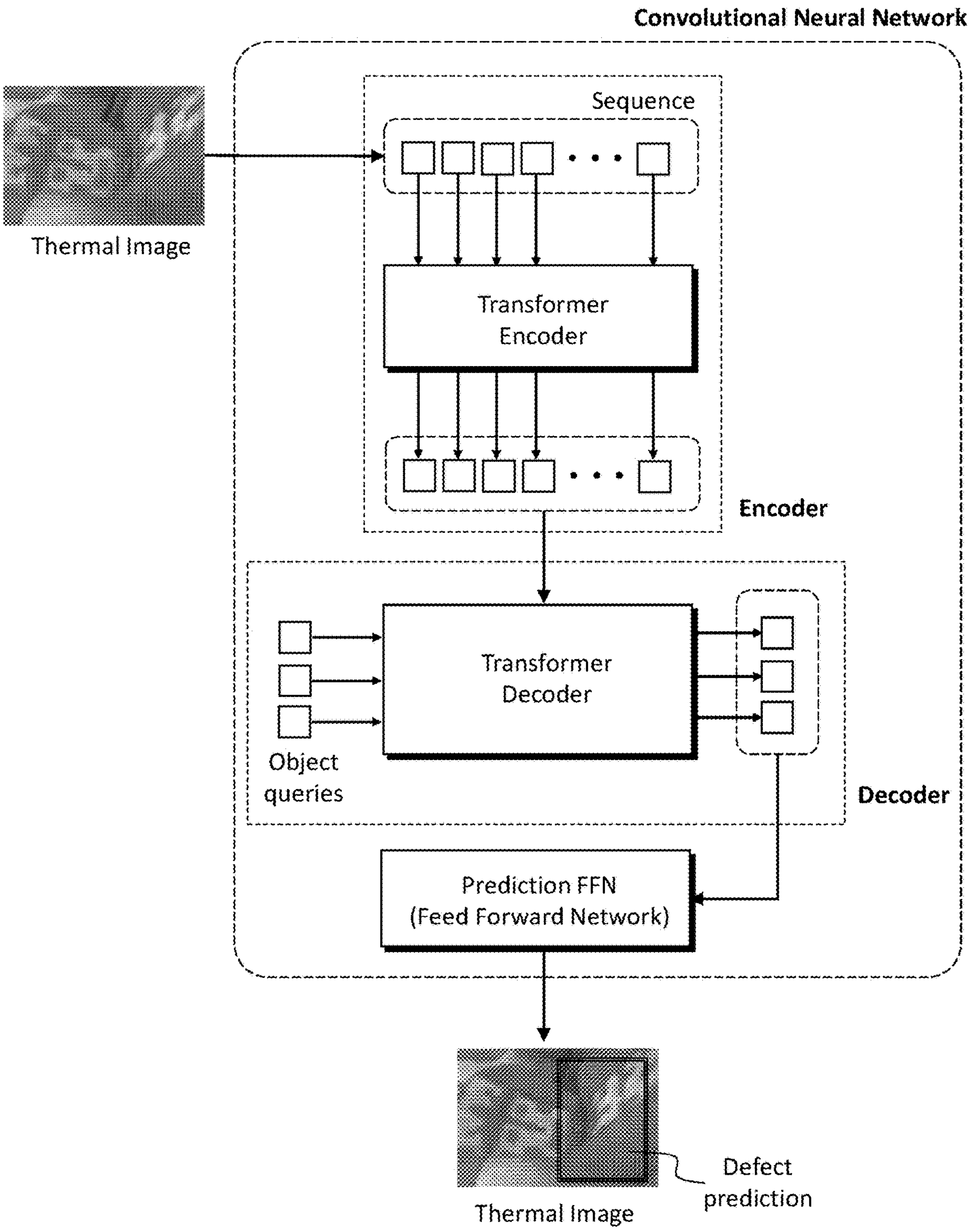
FIG. 5 is an example diagram illustrating the structure of an AI model according to an embodiment of the present disclosure.

FIG. 5 is an example diagram illustrating the structure of the AI model according to an embodiment of the present disclosure.

As shown in FIG. 5, the controller 240 may input the thermal image into the AI model implemented with the Convolutional Neural Network (CNN). Here, the CNN may have the transformer encoder-decoder structure.

In detail, the controller 240 may line up data forming the two-dimensional image to transform it into a single sequence and input it into the encoder. An anomaly detector may apply self-attention in the encoder to transform it into a single vector where data positions in the sequence are interconnected and input the transformed vector into the decoder. The controller 240 outputs the result value using the loss function based on the Hungarian algorithm in the decoder. Further, the controller 240 may detect defects by inputting the result value output from the decoder into a Feed-Forward Network (FFN).

Further, the encoder of the CNN according to an embodiment of the present disclosure may be modified to perform the convolution operation by reflecting the learnable offset in the size of the convolution filter, which is the area from which features are extracted, when performing the convolution operation in the input feature map to generate the output feature map. Through such a modification, the encoder may extract the feature from the grid area that is wider than a predetermined size of the convolution filter.

The encoder of the CNN according to an embodiment of the present disclosure may be modified to use the offset reflected in the size of the convolution filter as the attention key when performing the self-attention. Through such a modification, when a large object should be predicted from the two-dimensional image, a large offset is learned. When a small object should be predicted, a small offset is learned. This can improve the performance of the conventional CNN, which has low prediction performance for the relatively small object.

Meanwhile, the controller 240 may not simply determine defects in the car seat based on one thermal image, but may determine the presence or absence of an anomaly based on a plurality of two-dimensional images that are variously expanded from one thermal image.

As described above, preferred embodiments of the present disclosure have been disclosed in the specification and drawings. However, it is self-evident to those skilled in the art that other modifications may be made in addition to the embodiments disclosed herein. Although specific terms are used in the specification and drawings, they are merely for the purpose of describing particular embodiments only and are not intended to be limiting. Accordingly, the above description should not be construed as restrictive in all respects and should be considered illustrative. The scope of the present disclosure is indicated by the scope of the claims described below rather than a detailed description, and all changes or modifications derived from claims and equivalences thereof should be construed as being included in the scope of the present disclosure.

| [Detailed Description of Main Elements] |
|---|
| 100: parting agent spray automation device |
| 110: mold structure |
| 120: turn table |
| 130: spray part |
| 140: controller |
| 200: electronic component inspection device |
| 210: booth |
| 220: conveyor |
| 230: inspection part |
| 240: controller |

What is claimed is:

1. An electronic component inspection device using image analysis, the electronic component inspection device comprising:

a booth defining a closed space and configured to place at least one car seat to be inspected in the booth;

a conveyor configured to move the at least one car seat into the booth or move the at least one car seat to an outside of the booth;

an inspection part configured to acquire data generated from electronic equipment included in the at least one car seat, when the at least one car seat is placed at a preset position inside the booth by the conveyor; and a controller configured to control the booth, the conveyor, and the inspection part, wherein the inspection part further comprises:

a thermal imaging camera configured to detect radiant heat emitted from the at least one car seat placed in the booth, wherein the controller is configured to identify a plurality of heat source points based on a thermal image captured by the thermal imaging camera, generate a respective RGB (Red, Green, Blue) histogram for pixels included in a respective area within a preset distance from each of the plurality of heat source points, and compare the respective RGB histogram of each of the plurality of heat source points with the respective RGB histogram of at least one other of the plurality of heat source points, thereby detecting at least one defect in the at least one car seat.

2. An electronic component inspection device using image analysis, the electronic component inspection device comprising:

a booth defining a closed space and configured to place at least one car seat to be inspected in the booth;

a conveyor configured to move the at least one car seat into the booth or move the at least one car seat to an outside of the booth;

an inspection part configured to acquire data generated from electronic equipment included in the at least one car seat, when the at least one car seat is placed at a preset position inside the booth by the conveyor; and a controller configured to control the booth, the conveyor, and the inspection part, wherein the inspection part further comprises:

a thermal imaging camera configured to detect radiant heat emitted from the at least one car seat placed in the booth, when the at least one car seat is placed at the preset position by the conveyor, wherein the controller is configured to detect at least one defect in the at least one car seat by inputting a thermal image captured by the thermal imaging camera into an AI model implemented with a Convolutional Neural Network (CNN), wherein the CNN includes an encoder configured to perform a convolution operation on an input feature map to generate an output feature map, wherein, when performing the convolution operation on the input feature map to generate the output feature map, the encoder is configured to perform the convolution operation by reflecting a learnable offset in a size of a convolution filter, which is an area from which features are extracted, thereby extracting features from a grid area that is wider than the size of the convolution filter, and wherein the encoder is configured to use the learnable offset reflected in the size of the convolution filter as an attention key when performing self-attention, such that a larger offset is learned when a larger object is to be predicted from the thermal image and a smaller offset is learned when a smaller object is to be predicted.

3. The electronic component inspection device of claim 2, wherein the controller is configured to change resolution of the thermal image to create an image group including a plurality of two-dimensional images with different resolutions, input all the plurality of two-dimensional images included in the image group into the AI model implemented with the CNN, and combine a plurality of result values output from the AI model, thereby detecting the at least one defect in the at least one car seat.

4. The electronic component inspection device of claim 2, wherein the CNN has a transformer encoder-decoder structure including the encoder and a decoder, and wherein the controller is configured to line up data forming the thermal image to transform the data into a single sequence and input the single sequence into the encoder, the encoder is configured to apply the self-attention to transform the single sequence into a single vector in which data positions in the single sequence are interconnected and input the single vector into a decoder, and the decoder is configured detect the at least one defect in the at least one car seat using a loss function based on a Hungarian algorithm.

* * * * *